United States Patent
Marks (10) Patent No.: US 6,178,185 B1
(45) Date of Patent: *Jan. 23, 2001

(54) NETWORK INTERFACE DEVICE, METHOD AND ARTICLE OF MANUFACTURE FOR PROVIDING HIGH BIT RATE ACCESS OVER ROBBED BIT

(75) Inventor: Laurence Victor Marks, Raleigh, NC (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 08/978,298

(22) Filed: Nov. 25, 1997

(51) Int. Cl.[7] ....................................... H04J 3/12
(52) U.S. Cl. ............................ 370/514; 370/523
(58) Field of Search ............................ 370/523, 522, 370/524, 503, 510, 514, 242, 243, 244; 379/251, 509

(56) References Cited

U.S. PATENT DOCUMENTS

| | | | |
|---|---|---|---|
| 4,571,736 | 2/1986 | Agrawal et al. | 375/27 |
| 4,937,839 | 6/1990 | Motley et al. | 375/39 |
| 5,038,366 | 8/1991 | Motley et al. | 375/3 |
| 5,392,291 * | 2/1995 | Berkovich et al. | 379/509 |
| 5,408,524 * | 4/1995 | Reum | 379/251 |
| 5,515,426 | 5/1996 | Yacenda et al. | 379/201 |
| 5,528,679 | 6/1996 | Taarud | 379/34 |
| 5,640,387 * | 6/1997 | Takahashi et al. | 370/359 |
| 5,761,247 | 6/1998 | Betts et al. | 375/316 |
| 5,793,809 | 8/1998 | Holmquist | 375/245 |
| 5,859,872 | 1/1999 | Townshend | 375/242 |
| 5,875,229 | 2/1999 | Eyuboglu et al. | 379/1 |
| 5,995,558 | 11/1999 | Betts et al. | 375/316 |

* cited by examiner

Primary Examiner—Chau Nguyen
Assistant Examiner—Danny Nguyen
(74) Attorney, Agent, or Firm—John D. Flynn (57) ABSTRACT

A method, apparatus and article of manufacture are described. In particular two network interface devices that are connected over a path that includes a digital trunk using robbed-bit signaling use a technique to identify the presence of robbed-bit signaling. The network interface devices synchronize to bytes that are subject to robbed-bit signaling. The network interface devices must synchronize to the robbed-bit signaling to avoid transmitting information or receiving information in these signaling positions. The network interface devices then take advantage of the least significant bit positions of frames that are not used for robbed-bit signaling. This results in an increase in data carrying capacity from 56 kps to 62.7 kps.

15 Claims, 11 Drawing Sheets

| INDEX | BITS | | | | | | | |
|---|---|---|---|---|---|---|---|---|
| 1  | 0 | 0 | 0 | 0 | 0 | 1 | 0 | 0 |
| 2  | 0 | 0 | 0 | 0 | 1 | 1 | 0 | 0 |
| 3  | 0 | 0 | 0 | 1 | 0 | 1 | 0 | 0 |
| 4  | 0 | 0 | 0 | 1 | 1 | 1 | 0 | 0 |
| 5  | 0 | 0 | 1 | 0 | 0 | 1 | 0 | 0 |
| 6  | 0 | 0 | 1 | 0 | 1 | 1 | 0 | 0 |
| 7  | 0 | 0 | 1 | 1 | 0 | 1 | 0 | 0 |
| 8  | 0 | 0 | 1 | 1 | 1 | 1 | 0 | 0 |
| 9  | 0 | 1 | 0 | 0 | 0 | 1 | 0 | 0 |
| 10 | 0 | 1 | 0 | 0 | 1 | 1 | 0 | 0 |
| 11 | 0 | 1 | 0 | 1 | 0 | 1 | 0 | 0 |
| 12 | 0 | 1 | 0 | 1 | 1 | 1 | 0 | 0 |
| 13 | 0 | 1 | 1 | 0 | 0 | 1 | 0 | 0 |
| 14 | 0 | 1 | 1 | 0 | 1 | 1 | 0 | 0 |
| 15 | 0 | 1 | 1 | 1 | 0 | 1 | 0 | 0 |
| 16 | 0 | 1 | 1 | 1 | 1 | 1 | 0 | 0 |
| 17 | 1 | 0 | 0 | 0 | 0 | 1 | 0 | 0 |
| 18 | 1 | 0 | 0 | 0 | 1 | 1 | 0 | 0 |
| 19 | 1 | 0 | 0 | 1 | 0 | 1 | 0 | 0 |
| 20 | 1 | 0 | 0 | 1 | 1 | 1 | 0 | 0 |
| 21 | 1 | 0 | 1 | 0 | 0 | 1 | 0 | 0 |
| 22 | 1 | 0 | 1 | 0 | 1 | 1 | 0 | 0 |
| 23 | 1 | 0 | 1 | 1 | 0 | 1 | 0 | 0 |
| 24 | 1 | 0 | 1 | 1 | 1 | 1 | 0 | 0 |
| 25 | 0 | 0 | 0 | 0 | 0 | 1 | 1 | 1 |
| 26 | 0 | 0 | 0 | 0 | 1 | 1 | 1 | 1 |
| 27 | 0 | 0 | 0 | 1 | 0 | 1 | 1 | 1 |
| 28 | 0 | 0 | 0 | 1 | 1 | 1 | 1 | 1 |
| 29 | 0 | 0 | 1 | 0 | 0 | 1 | 1 | 1 |
| 30 | 0 | 0 | 1 | 0 | 1 | 1 | 1 | 1 |
| 31 | 0 | 0 | 1 | 1 | 0 | 1 | 1 | 1 |
| 32 | 0 | 0 | 1 | 1 | 1 | 1 | 1 | 1 |
| 33 | 0 | 1 | 0 | 0 | 0 | 1 | 1 | 1 |
| 34 | 0 | 1 | 0 | 0 | 1 | 1 | 1 | 1 |
| 35 | 0 | 1 | 0 | 1 | 0 | 1 | 1 | 1 |
| 36 | 0 | 1 | 0 | 1 | 1 | 1 | 1 | 1 |
| 37 | 0 | 1 | 1 | 0 | 0 | 1 | 1 | 1 |
| 38 | 0 | 1 | 1 | 0 | 1 | 1 | 1 | 1 |
| 39 | 0 | 1 | 1 | 1 | 0 | 1 | 1 | 1 |
| 40 | 0 | 1 | 1 | 1 | 1 | 1 | 1 | 1 |
| 41 | 1 | 0 | 0 | 0 | 0 | 1 | 1 | 1 |
| 42 | 1 | 0 | 0 | 0 | 1 | 1 | 1 | 1 |
| 43 | 1 | 0 | 0 | 1 | 0 | 1 | 1 | 1 |
| 44 | 1 | 0 | 0 | 1 | 1 | 1 | 1 | 1 |
| 45 | 1 | 0 | 1 | 0 | 0 | 1 | 1 | 1 |
| 46 | 1 | 0 | 1 | 0 | 1 | 1 | 1 | 1 |
| 47 | 1 | 0 | 1 | 1 | 0 | 1 | 1 | 1 |
| 48 | 1 | 0 | 1 | 1 | 1 | 1 | 1 | 1 |

| INDEX | BITS | | | | | | | |
|---|---|---|---|---|---|---|---|---|
| 1 | 1 | 0 | 1 | 1 | 1 | 0 | 0 | 1 |
| 2 | 1 | 0 | 1 | 0 | 1 | 1 | 0 | 1 |
| 3 | 1 | 0 | 1 | 0 | 0 | 0 | 0 | 1 |
| 4 | 1 | 0 | 0 | 1 | 0 | 1 | 0 | 1 |
| 5 | 0 | 0 | 0 | 1 | 1 | 0 | 0 | 1 |
| 6 | 0 | 0 | 1 | 0 | 1 | 1 | 0 | 1 |
| 7 | 0 | 0 | 1 | 0 | 0 | 0 | 0 | 1 |
| 8 | 0 | 0 | 0 | 1 | 0 | 1 | 0 | 1 |
| 9 | 1 | 0 | 0 | 1 | 0 | 1 | 1 | 1 |
| 10 | 1 | 0 | 1 | 0 | 1 | 0 | 1 | 1 |
| 11 | 1 | 0 | 0 | 1 | 1 | 1 | 1 | 1 |
| 12 | 1 | 0 | 0 | 1 | 0 | 0 | 1 | 1 |
| 13 | 0 | 0 | 1 | 1 | 0 | 1 | 1 | 1 |
| 14 | 0 | 0 | 1 | 0 | 1 | 0 | 1 | 1 |
| 15 | 0 | 0 | 0 | 1 | 1 | 1 | 1 | 1 |
| 16 | 0 | 0 | 0 | 1 | 0 | 0 | 1 | 1 |
| 17 | 1 | 0 | 1 | 1 | 0 | 1 | 0 | 1 |
| 18 | 1 | 0 | 1 | 0 | 1 | 0 | 0 | 1 |
| 19 | 1 | 0 | 0 | 1 | 1 | 1 | 0 | 1 |
| 20 | 1 | 0 | 0 | 1 | 0 | 0 | 0 | 1 |
| 21 | 0 | 0 | 1 | 1 | 0 | 1 | 0 | 1 |
| 22 | 0 | 0 | 1 | 0 | 1 | 0 | 0 | 1 |
| 23 | 0 | 0 | 0 | 1 | 1 | 1 | 0 | 1 |
| 24 | 0 | 0 | 0 | 1 | 0 | 0 | 0 | 1 |
| 25 | 1 | 0 | 1 | 1 | 1 | 0 | 0 | 0 |
| 26 | 1 | 0 | 1 | 0 | 1 | 1 | 0 | 0 |
| 27 | 1 | 0 | 1 | 0 | 0 | 0 | 0 | 0 |
| 28 | 1 | 0 | 0 | 1 | 0 | 1 | 0 | 0 |
| 29 | 0 | 0 | 1 | 1 | 1 | 1 | 0 | 0 |
| 30 | 0 | 0 | 1 | 0 | 1 | 1 | 1 | 0 |
| 31 | 0 | 0 | 1 | 0 | 0 | 0 | 0 | 0 |
| 32 | 0 | 0 | 0 | 1 | 0 | 1 | 0 | 0 |
| 33 | 1 | 0 | 1 | 1 | 0 | 1 | 1 | 0 |
| 34 | 1 | 0 | 1 | 0 | 1 | 0 | 1 | 0 |
| 35 | 1 | 0 | 0 | 1 | 1 | 1 | 1 | 0 |
| 36 | 1 | 0 | 0 | 1 | 0 | 0 | 1 | 0 |
| 37 | 0 | 0 | 1 | 1 | 0 | 1 | 1 | 0 |
| 38 | 0 | 0 | 1 | 0 | 1 | 0 | 1 | 0 |
| 39 | 0 | 0 | 0 | 1 | 1 | 1 | 1 | 0 |
| 40 | 0 | 0 | 0 | 1 | 0 | 0 | 1 | 0 |
| 41 | 1 | 0 | 1 | 1 | 0 | 1 | 0 | 0 |
| 42 | 1 | 0 | 1 | 0 | 1 | 0 | 0 | 0 |
| 43 | 1 | 0 | 0 | 1 | 1 | 1 | 0 | 0 |
| 44 | 1 | 0 | 0 | 1 | 0 | 0 | 0 | 0 |
| 45 | 0 | 0 | 1 | 1 | 0 | 1 | 0 | 0 |
| 46 | 0 | 0 | 1 | 0 | 1 | 0 | 0 | 0 |
| 47 | 0 | 0 | 0 | 1 | 1 | 1 | 0 | 0 |
| 48 | 0 | 0 | 0 | 1 | 0 | 0 | 0 | 0 |

FIG. 11

NETWORK INTERFACE DEVICE, METHOD AND ARTICLE OF MANUFACTURE FOR PROVIDING HIGH BIT RATE ACCESS OVER ROBBED BIT

RELATED APPLICATIONS

The present invention relates to "A SYSTEM, METHOD, AND ARTICLE OF MANUFACTURE FOR HIGH BIT RATE ACCESS OVER ROBBED BIT TRUNKS" Ser. No.: 08/978,109 filed Nov. 25, 1997, now U.S. Pat. No. 6,104,730, assigned to the same assignee as the present invention, herein incorporated by reference.

BACKGROUND OF THE INVENTION

1. Field of the Invention

The present invention relates to data communications over a telephone network, and more particularly to a network interface device, method, and article of manufacture providing for high bit rate data communication over robbed bit trunks.

2. Description of the Prior Art

Recently V.pcm modem technology has emerged which uses pulse amplitude modulation (PAM) techniques to transfer data at 56,000 bits per second. This technology is based on the premise that the 56K transmitter is digitally connected to the public telephone network and can control the pattern sent to the telephone network codec (digital to analog converter) driving the analog link to the receiver.

The digital portion of the telephone network transfers data as 8,000 8-bit samples per second, or 64,000 bits per second per channel (i.e., one channel of a T1 trunk using a DS-1 structure). However, due to a variety of factors, prior art transfer rates are limited to 56,000 bps. This leaves 8,000 bits per second capacity that does not get utilized for communication.

There are two main reasons why current technology is limited to 56,000 bits per second. The first concerns granularity and discrimination. These 56K modems use Pulse Amplitude Modulation (PAM) for transmission with eight bits per sample. Current signal processing technology cannot resolve the least-significant bit in the recovered signal, so only 128 different codes are sent, out of 256 possible codes, lowering the maximum bit rate to 56,000 from 64,000 bits per second. This problem is particularly difficult with codes corresponding to low signal amplitudes, since telephony codecs use a logarithmic ($\mu$-law) characteristic. For these codes, not only are the absolute levels lower, but discrete levels are closer together, compared to higher amplitudes. This problem does not apply to the ISDN technology where no telephony codec is involved.

The second reason why current technology is limited to 56,000 bps is so-called "robbed-bit" signaling. On certain trunks, the digital portion of North American telephone systems 'robs' the least-significant bit (LSB) of every sixth sample, replacing it with signaling information. Signaling generally means the passing of call related information such as hookswitch status, address, and number being called. This signaling information does not change during the useful portion of a telephone call and thus the robbed-bit signaling results in having the bit stuck or set to one value, and hence correct half the time. This is unnoticed in voice telephone conversations, and only marginally affects conventional (QAM, DPSK, FSK, etc.) modems, but irrevocably corrupts PAM transmissions. With robbed bit signaling even though only one bit out of every six samples is used for signaling, there is no way to communicate between ends which bit is corrupt, so all LSBs must be unused.

Robbed-bit signaling is also a problem for ISDN links where both ends of a connection are digitally connected. ISDN devices coupled through a robbed-bit trunk can only transfer data at 56,000 bits per second, avoiding all use of the LSB, even though only one bit out of six samples is corrupt. Therefore, maximum throughput for ISDN devices coupled through a robbed-bit link is 56,000 bits per second. Thus, robbed-bit signaling limits throughput on ISDN systems using a robbed-bit trunk.

These unresolved problems and deficiencies are clearly felt in the art and are solved by the invention in the manner described below.

SUMMARY OF THE INVENTION

It is an object of the invention to provide high data access to the internet from a host computer.

It is yet another object of the invention to provide a modem capable of high speed access to the internet using standard telephone lines.

It is yet a further object of the present invention to provide a network interface device that supports highest possible data communications over robbed trunks.

It is an object of the invention to increase the maximum possible transmission rate over robbed-bit lines by identifying which frame positions may be corrupt, and avoiding only those positions for a pair of devices attached through the Public Switched Telephone Network, where at least one of the devices is attached digitally.

It is a further object of this invention to increase maximum possible transmission rates by identifying when no bits are robbed, for a pair of devices attached through the Public Switched Telephone Network, where at least one of the devices is attached digitally.

The above-mentioned needs have been met in accordance with the present invention by providing a communication system for increasing data throughput on robbed bit trunks. A method, apparatus and article of manufacture for transmitting and/or receiving data from a robbed trunk with higher data throughput is provided. A communication system is provided having two network interface devices that are connected over a path that includes a digital trunk using robbed-bit signaling. The network interface devices use a technique to identify the presence of robbed-bit signaling. The network interface devices synchronize to bytes that are subject to robbed-bit signaling. The network interface devices must synchronize to the robbed-bit signaling to avoid transmitting information or receiving information in these signaling positions. The network interface devices then take advantage of the least significant bit positions of frames that are not used for robbed-bit signaling. This results in an increase in data carrying capacity from 56 kps to 62.7 kps.

BRIEF DESCRIPTION OF THE DRAWINGS

The foregoing and other objects, aspects and advantages of the invention will be better understood from the following detailed description with reference to the drawings, in which.

DETAILED DESCRIPTION

Figure 1:
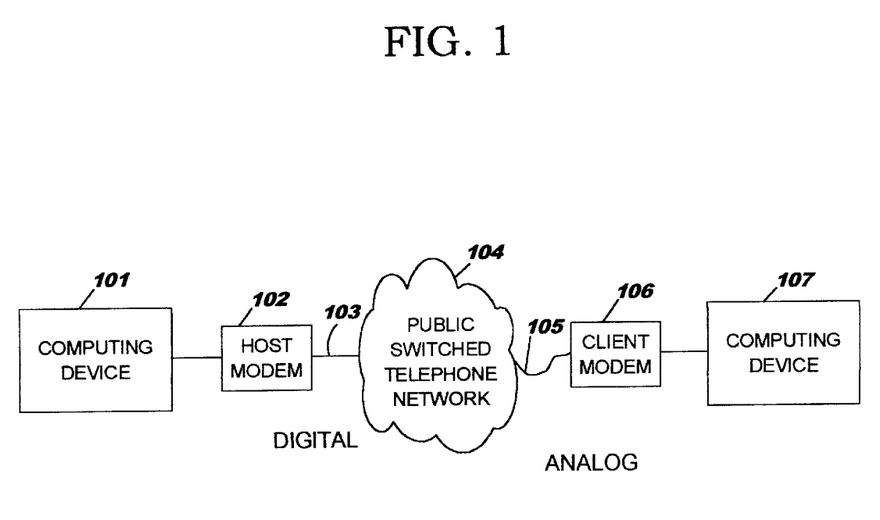
FIG. 1 depicts the environment in which V.pcm PAM modems communicate.

FIG. 1 depicts an overview of a communication system for connecting two computing devices thorough the Public Switched Telephone Network (PSTN). The system makes use of Network Interface Devices (NIDs) 102 and 106 which are coupled to computing devices 101 and 107 respectfully. A NID may be an analog or digital modem or Data Circuit-terminating Equipment (DCE) or ISDN Terminal Adapter or terminal equipment or Network Adapter or part of the computing devices or Data Terminal Equipment (DTE). The present invention increases throughput between the computing devices by determining the type of connection established through the PSTN and making better use of available bandwidth on the connection. If the connection makes use of a robbed-bit signaling trunk, capacity on the connection can be increased from 56 kbps to 62.7 kbps. The present invention will described with respect to transmission of data from a host NID to a client NID. Each NID is capable of transmitting data onto the network and receiving data from the network The present invention detects the use of robbed-bit signaling on the connection through the PSTN and permits the NIDs to synchronize with the robbed-bit signaling. Having synchronized each NID to the robbed-bit signaling used on the connection, the transmitting NID avoids using these robbed-bit positions to transmit data content. The receiving NID ignores these robbed-bit positions in the received data stream. Because robbed-bit signaling uses one bit from every six samples on the digital trunk, the present invention permits use of the LSB of the five other samples which results in an increased throughput of approximately 6266 bps per channel.

As depicted in FIG. 1, the host NID is connected to the PSTN using a digital connection while the client uses an analog connection that makes use of a modulation scheme such as PAM. The analog side may make use of a clock signal derived from received data in order to maintain synchronization. The present invention may be used to send and receive data in both directions from host to client and client to host. For two-way use of the present invention (i.e., host-to-client and client-to-host) the transmitting and receiving techniques described herein are performed for each direction. If an analog modem, e.g., PAM, is used then the modem will make use of a clock signal derived from the received data stream.

Figure 2:
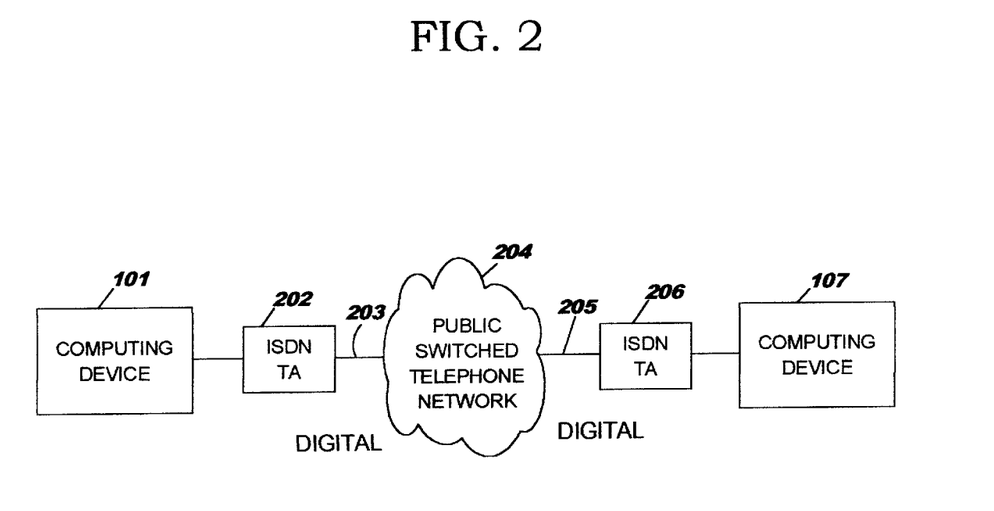
FIG. 2 depicts the ISDN environment.

FIG. 2 depicts the present invention using ISDN lines and corresponding ISDN NIDs which are digitally connected with the PSTN. Thus, when the host and client NIDs are ISDN devices there is no need for either the host or the client NID to derive the clock from the received data stream, as the ISDN interface provides a clock signal. Both BRA and PRA interfaces have timing and framing (byte alignment) information available.

Figure 3:
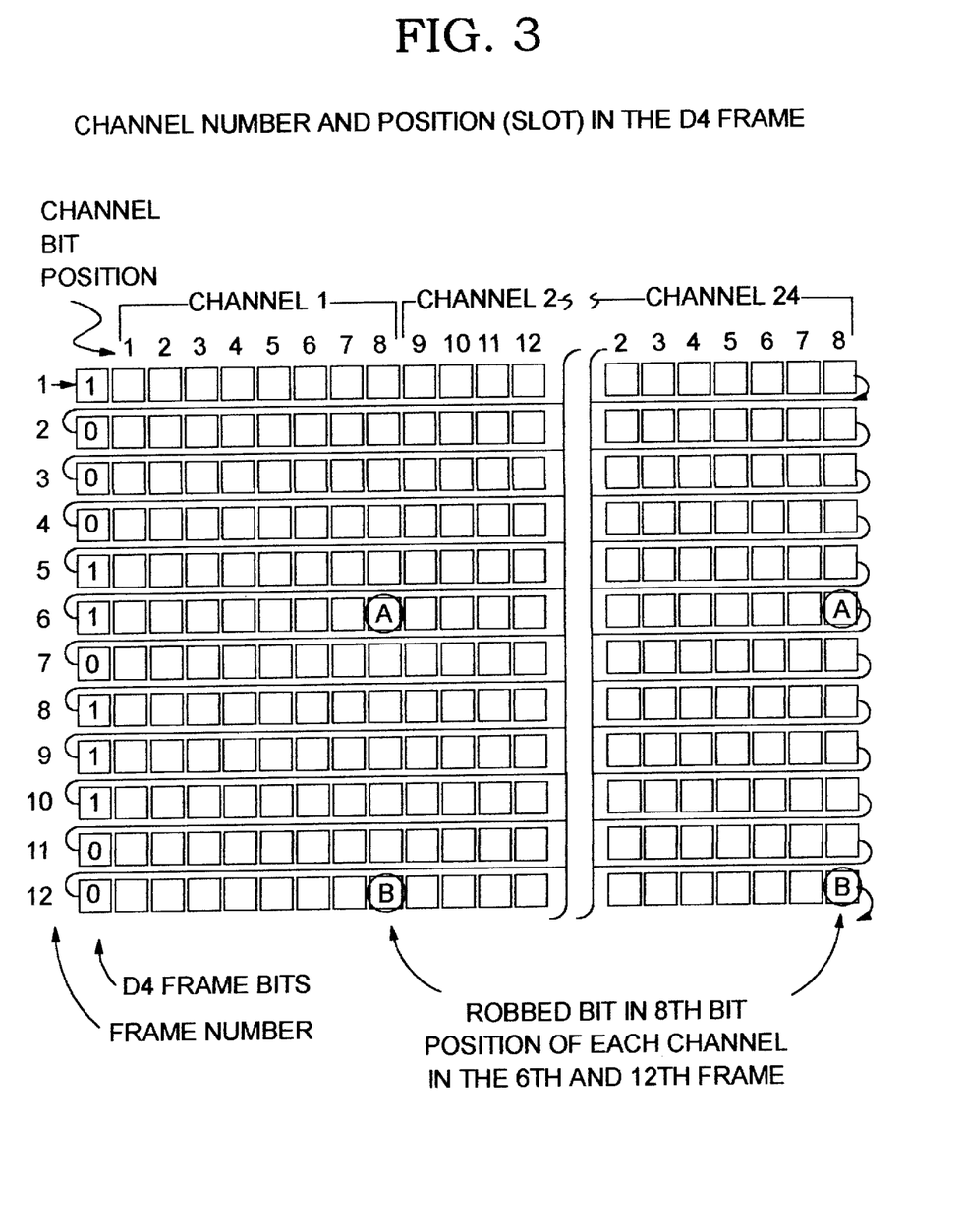
FIG. 3 depicts robbed-bits in a D4 super frame.
Figure 4:
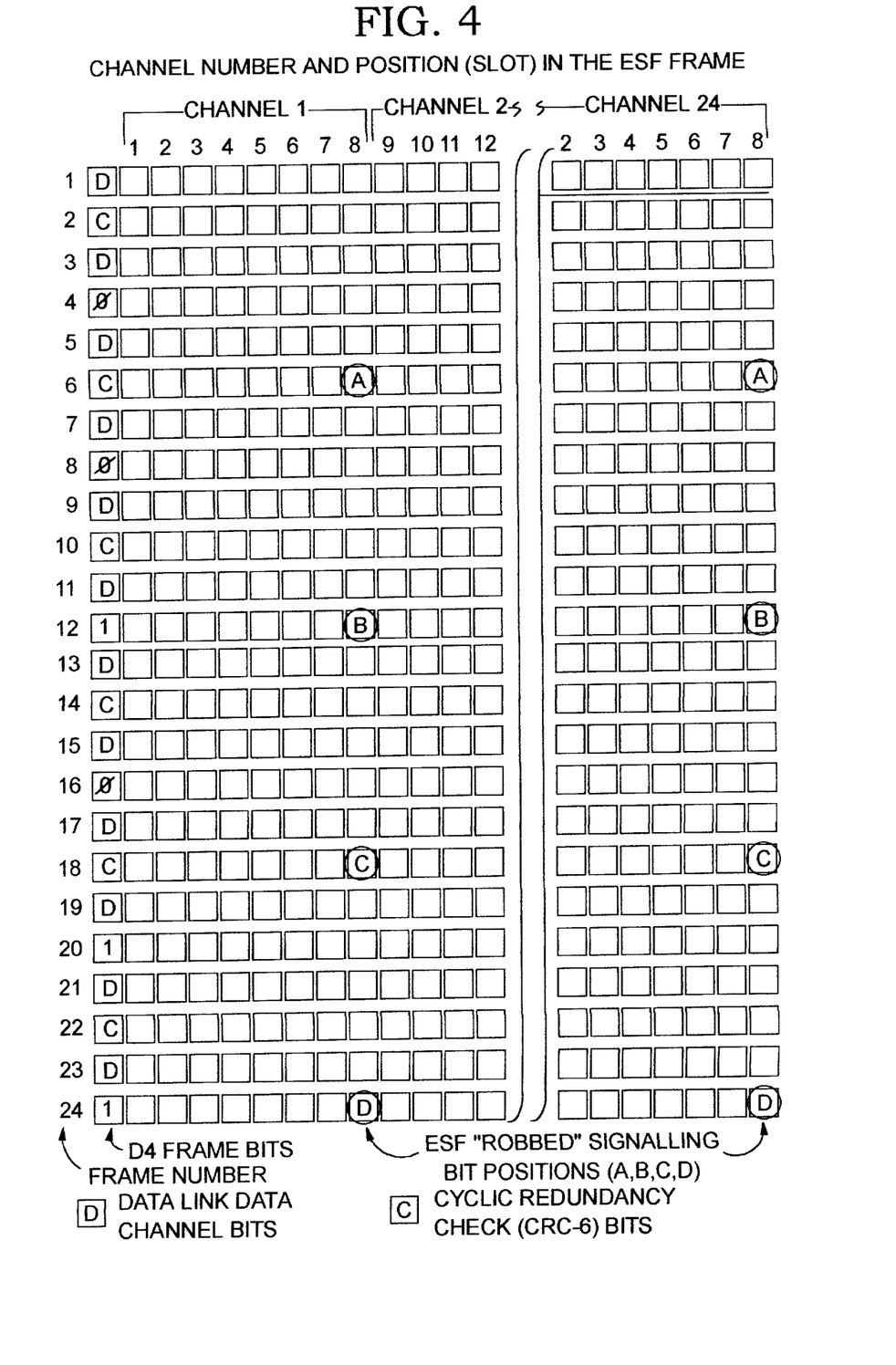
FIG. 4 depicts robbed-bits in an Extended Super Frame (ESF) Format.

In order to better understand the preferred embodiment of the present invention it is necessary to understand how robbed-bit signaling is utilized in a typical PSTN. There are two frame formats in common use on digital trunks in the United States. The first frame format is D4 or Super Frame, which has twelve frames per superframe. Each frame contains one framing bit plus 24 8-bit channels. The D4 framing pattern reserves two signaling bits a and b per superframe which may be used for PSTN signaling information as shown in FIG. 3. These robbed signaling bits use the same positions within every superframe (e.g., the LSB of the $6^{th}$ and $12^{th}$ frame of every channel). The second frame format is called Extended Super Frame (ESF), which has twenty-four frames per superframe. Each frame contains one framing bit plus 24 8-bit channels. The ESF framing pattern reserves four bits, a, b, c, and d per superframe which may be used for PSTN signaling information as shown in FIG. 4. Thus, robbed-bit signaling uses the LSB of every sixth frame within the superframe (i.e., a, b, c, d). The same bit positions are reserved for signaling in every ESF superframe (e.g., the LSB of the $6^{th}$, $12^{th}$, $18^{th}$ and $24^{th}$ frame of every channel).

It is important to note that superframe information is used internally by the PSTN and is only provided to primary rate access(PRA) and T1 attached NIDs, not to basic rate access (BRA) and analog attached NIDs. The present invention does not require that this information be available and is therefore applicable to PRA, T-1, BRA and POTS/analog connections. Also, a PSTN connection may use one or more channels in an outgoing direction and one or more channels in the incoming direction. The invention has applicability to T1 NIDs and ISDN primary NIDs to potentially increase in the capacity of the T1 trunk from 56 kbps per channel to 62.7 kbps per channel, across all 24 channels.

Making use of the unused LSB positions requires synchronization of the host and client NIDs with the robbed-bit signaling. This permits determination of where in the transmitted and received data stream robbed-bits will occur. Typically a user data stream is provided to a NID for transmission across a network and reception by a second NID which recovers the user data stream. The NID may transform the user data by use of encoding such as: encryption, scrambling, compression, error detection encoding, error correction encoding, framing and/or High-Level Data Link Control (HDLC). The transmit data stream are the bits or representation of bits transmitted by the NID or the transformed user data. It is the transmitted data stream that is modified to account for robbed-bit signaling. As was stated above, prior art systems typically suppressed the use of the LSB of every output byte. This was typically accomplished by suppressing the output of the transformed user data after transmitting seven bits and padding the eighth or LSB position with a one or zero. This can be implemented in a variety of ways such as suppressing the clock signal of a serializer for a single clock cycle every 8 bits. The present invention only causes suppression of every $48^{th}$ bit (the LSB of every sixth output byte) of the output stream corresponding to the robbed-bit signaling bit on the robbed-bit trunk. In the case of a PAM link, the parallel stream (i.e., a symbol representing a frame/byte) derived from the modified serial stream is transmitted.

The inverse operations are performed by the receiving side at the destination NID. The $48^{th}$ bit(the LSB of every sixth received byte/frame) is stripped or ignored and this data stream minus the stripped bit is then decoded by the destination NID. The inverse of the transmitter functions are then performed on the stripped data stream. Decoding such as decryption, unscrambling, decompression, error detection, error correction, frame stripping are then performed as necessary to produce the user data stream. The transmitting NID and the receiving NID must be synchronized so that the "suppression of output" or "injection of dummy values" of the transmitted data stream corresponds or synchronizes with the "stripped bit" or "discarded bit" or "ignored bit" on the receiving side. In the case of an analog NID the received signal is first demodulated as follows: for all non robbed bit samples, the PAM sample is quantized to eight bits of accuracy and robbed bit samples are quantized to seven bits of accuracy.

The present invention may be described as operating in three phases: the startup phase, the synchronization phase and the operational phase. The startup phase establishes a connection or path between the host NID and client NID where information is exchanged concerning the capabilities of each NID. The synchronization phase determines if robbed-bit signaling is used on the connection between two NIDs and establishes synchronization for the host and client NIDs for determining robbed-bit locations in outgoing and incoming streams. The operational phase involves transmitting an output stream(s) with dummy or null values in robbed-bit positions and with skipping or ignoring or discarding bits in these robbed-bit positions on received incoming streams. These phases are described in more detail below.

Start Up

When V.34 NIDs first connect, they execute a handshaking protocol called V.8, in which each NID can identify itself, its capabilities and requirements (modem, fax, modulation scheme, cellular, etc.) There are codepoints in the V.8 table reserved for future use. One of these codepoints could be used to indicate that a NID is digitally connected, capable of PAM transmission and/or capable of 62.7 kbps communication.

In the case of ISDN, capable devices could identify themselves in either a call setup message (ITU-T recommendation Q.931 low layer compatibility element) in the D-channel, or as a part of protocol startup in the B-channel (for example, IETF Link Control Protocol or LCP, or the BONDING protocol).

Figure 10:
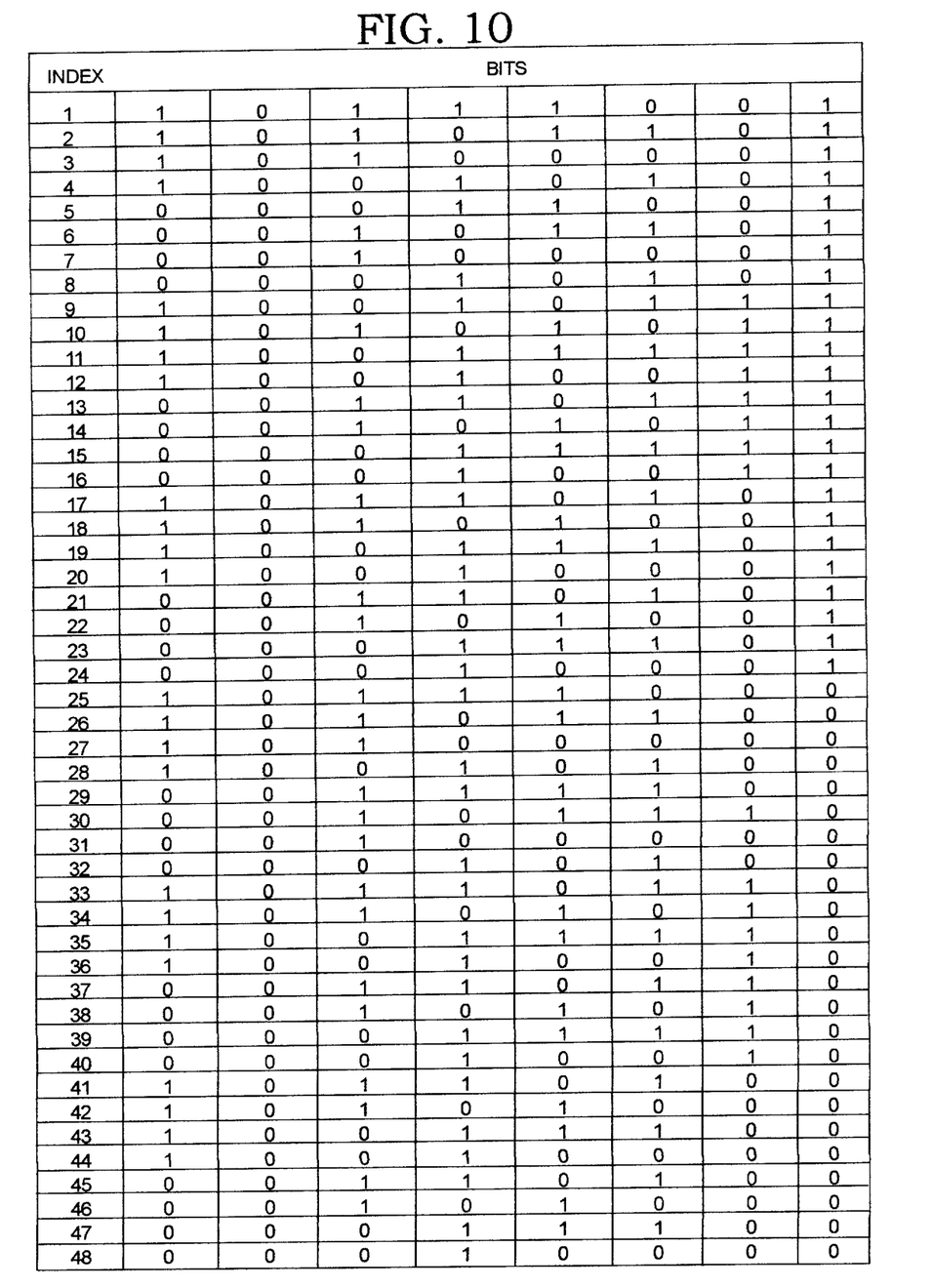
FIG. 10 depicts an embodiment of a test pattern suitable for use on PAM connection.

The type of connection (i.e., analog or digital) may be used to tailor the test pattern to the connection type. For example, if both NIDs are digitally connected then a test pattern shown in FIG. 5 may be used. However, if an NID is connected via a PAM scheme a test pattern as shown in FIG. 10 may be sent to the PAM connected NID. The test pattern can be tailored to the particularly needs of the connection.

Any protocol can be used to establish a connection between a transmitter and receiver and exchange relevant information. If either the host NID or the client NID is not capable of operating at higher bit rates there is no need to attempt higher data throughput available by use of the present invention.

Synchronization Phase

Once the NIDs have established that one is digitally connected, and the other is at least capable of PAM transmission/reception at a suitable rate (by the means specified above or otherwise), they enter the synchronization phase to determine which transmitted byte/frame positions correspond to robbed-bit signaling positions. This is accomplished by the host NID sending a test pattern. The client NID receives the test pattern as modified by transmission through the network and determines which bytes/frames are affected by robbed-bit signaling. This information is then sent by the client NID to the host NID. The host NID and client NID each have timing devices such as a modulo-N counters which are synchronized and inform each as to which transmitted/received byte/frame will be subjected or is subjected to robbed-bit signaling. This information is used by the host NID to send data and by the client NID to receive data.

The synchronization is symmetric and can be performed in both directions. The host sends the test pattern to the client and synchronization is performed in a first direction and then the client sends a test pattern to the host NID with synchronization performed in the other direction.

With the preferred embodiment, the NID transmitter sends a self-indexing pattern or numbered patterns with the potentially robbed-bit positions in known states. This enables the receiver to identify and indicate which bits are corrupted and permit synchronization with the transmitter. The NID sending the test pattern must be able to maintain the synchronization it has sent throughout the call, regardless of whether data or an idle pattern is being sent.

As noted earlier, the robbed-bits will not change value during the stable portion of the call. The preferred embodiment of the present invention uses a robust test pattern which tests potential robbed-bit position in both the 0 and 1 states to identify which bits are being used for robbed-bit signaling. The LSB of each byte/frame is a potential robbed-bit position. In accordance with the preferred embodiment the test pattern transmitted over a connection using D4 framing would use at least 24 frames, twelve with the LSB of each byte at 0 and twelve with the LSB at 1. A connection with ESF framing would use at least 48 frames, 24 with the LSB at 0 and 24 with the LSB bit at 1. Since the NIDs cannot easily detect which type of framing is in use on a current call (and perhaps segments of a call may be carried by each type), the ESF-type test may be used in all instances.

Figure 5:
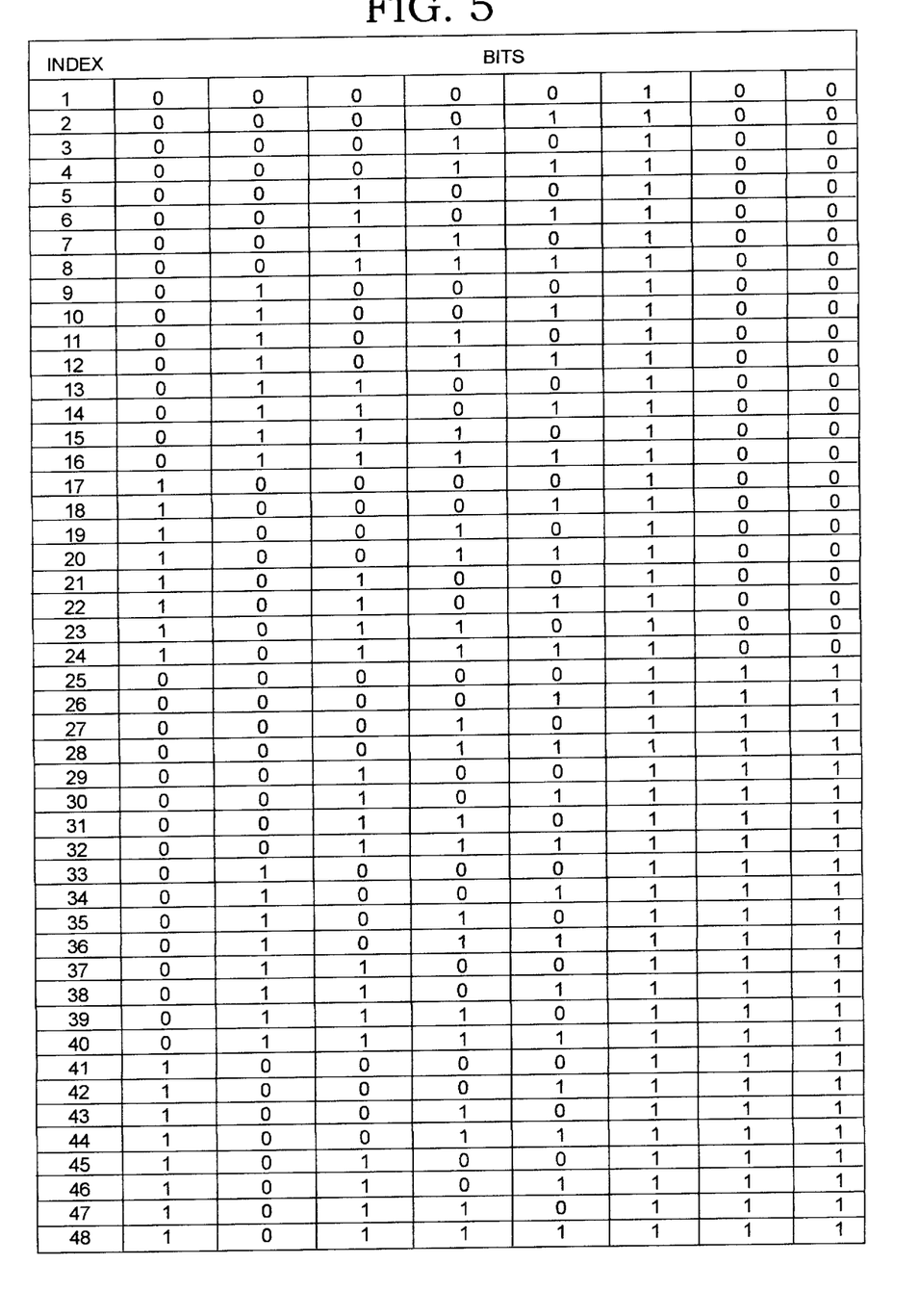
FIG. 5 depicts an embodiment of a test pattern used to detect robbed-bit signaling.

The preferred embodiment of a test pattern is shown in FIG. 5. This pattern is meant to be representative of a robust test pattern. As will be apparent to the person of ordinary skill in the art there are many other patterns that will serve for identification of the position of the robbed-bits so they may be communicated from NID receiver to NID transmitter. The test pattern need not be self-indexing. A repeating sequence of at least twice the number of frames separating robbed bit signaling positions is all that is required. Thus, other patterns that are a multiple of six can also serve to determine which bits are used or reserved for robbed-bit signaling. The test pattern may include encoding to redundantly indicate the value of the LSB.

Returning to FIG. 5, note the following characteristics of the preferred embodiment of the test pattern:

1.) The pattern sequence has 48 patterns. Repeating sequences will synchronize with the robbed-bits; i.e., the robbed-bits will occur in the same place in each repetition.

2.) The first five MSBs of each byte/frame contain the binary index value of the byte/frame within the test pattern. For instance binary values representing 0–23 if a 48 byte test pattern is utilized. This serves as the synchronization value for the transmitter and receiver 3.) The eighth bit is the LSB and is the bit that is potentially robbed by the digital trunk. It is the test bit and it is sent as both 0 and 1. If this bit is robbed then the 0 or 1 state will be corrupted. The first half of the test sequence detects signaling bits held at 1; the second half of the test sequence detects signaling bits held at 0. This is done to permit detection of robbed-bit signaling whether the robbed-bit signaling makes use of a 0 or a 1 in LSB position. Note that each index is included twice in the test pattern once with '11' and once with '00'.

4.) The seventh bit is identical to the eighth. This simplifies detection of the LSB affected by robbed bit signaling. The receiver can compare the seventh and eighth bits of each pattern, noting which miscompare.

5.)The value of the sixth bit is irrelevant; but is shown as a '1' in FIG. 5.

The receiver monitors the incoming test pattern to synchronize its timing device with the transmitter's timing device. Using the preferred scheme, the receiver creates a list comprised of the index numbers or synchronization values of all corrupted or miscomparing bytes/frames. The receiver then sends this list to the transmitter. Of course, if the receiver obtained inconsistent results (e.g., corrupted bits not spaced multiples of six bytes, expected corrupted bit not corrupted), it could send a message to the transmitter asking for another test sequence or process the next test pattern.

The preferred embodiment uses a test pattern containing frames where the two LSBs of the frame match. However, for purposes of the present invention it is sufficient that the correct value of the LSB be derivable from the value of the seven MSBs of this frame or other frames or other knowledge of the test pattern. For example, the LSB of each frame could be defined as parity of the upper seven bits, or some logical or table lookup value of those bits, or even bits of a preceding or succeeding frame.

It is not necessary to generate test patterns using a modulo counter. Any repeating sequence standardized between transmitter and receiver including sequence values sent at each frame sufficiently distinguishable to permit synchronization, with sequence length at least twice the number of frames separating robbed bit positions (e.g., 6 in North America), and such that the LSB of all frames in the superframe is tested at both 0 and 1.

A sequence may also be generated by a state machine, feedback shift register, or by table lookup from a 'circular' storage buffer, that is, a buffer with index which takes on a repeating set of values or other mechanism. The synchronization value or a representation thereof, permits the transmitter and the receiver to synchronize their respective sequences. The synchronization value may be the content of the table, the sequence value or an sequence index that is used to test the link between transmitter and receiver. The receiver may return either the sequence index or the sequence value or the synchronization value to communicate corrupt frames numbers or robbed bit positions, and either may be used for local comparisons, to determine when to suppress transmission or reception.

Operational phase

The transmitter uses the index information sent by the receiver to enter a state where eight-bits of user payload data are transmitted for all bytes/frames except those identified as subject to robbing by the digital trunk, and seven bits of user payload data and one pad bit are transmitted in each byte/frame identified as subject to robbing by the digital trunk. The receiver uses the index information to enter a state where eight-bits of user payload data are received for all bytes/frames except those identified as subject to robbing by the digital trunk, and then seven bits of user payload data are received and one pad bit is discarded in each byte/frame identified as subject to robbing by the digital trunk. Each NID may act as both a transmitter and receiver if full duplex use of the present invention is desired.

Network Interface Devices—Transmission

In order to maintain framing synchronization in accordance with the preferred embodiment of the invention the transmitter side of the NID must be capable of:

1) Sending byte patterns that are byte aligned with the transmission frames on the digital trunk.

2) Transparently sending (repetitively) a test pattern such as the 48-byte pattern shown in FIG. 5 (e.g., sending the data without HDLC envelopes)

3) Keeping track of frame periods, even when no data is being sent, so that subsequent frames may be sent with known alignment to PSTN framing signals. That is, during the operational phase, the sequence generator or sequencer continues to advance, regardless of whether data or idle or an idle pattern is being sent.

Figure 6:
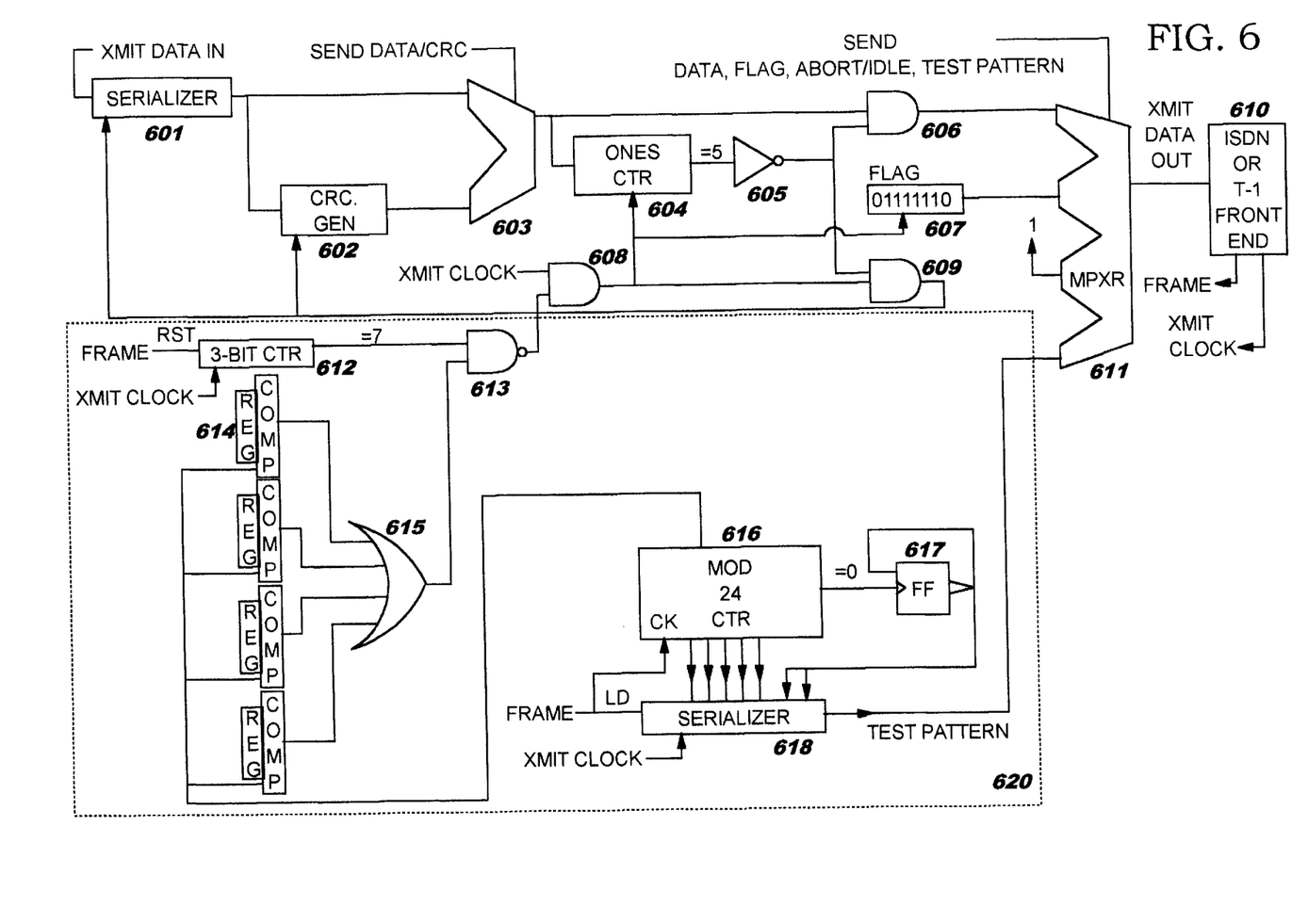
FIG. 6 depicts an embodiment of a transmitter in accordance with the present invention.

FIG. 6 depicts the transmission side of a NID in accordance with the preferred embodiment of the invention. Components 601 through 611 represent one embodiment of an HDLC transmitter. Serializer 601 accepts parallel data and shifts it out serially upon receiving gated transmit clock pulses from AND gate 609. These data are also used to generate a Cyclic Redundancy Check in CRC generator 602, also clocked by the gated clock from AND 609. Multiplexer 603 is controlled by a state machine (not shown) which determines whether data or CRC is to be sent. Ones counter 604, inverter 605, AND gate 606, and AND gate 609 perform the HDLC Zero-Bit Insertion function. If during the transmission of data or CRC, five consecutive one bits have been transmitted, transmission is halted, and a zero bit is inserted into the data stream to avoid the appearance of a false flag or abort character. Multiplexer 611 is controlled by a state machine (not shown) to cause the transmission of data or CRC, the HDLC flag character (generated by shift register 607, not subject to zero bit insertion), or a stream of ones (for the idle condition). In one embodiment of the current invention, Multiplexer 611 also can cause the transmission of the test pattern generated by components 616, 617, and 618. Front end electronics 610 serves to modify the data pattern to match standard digital framing formats or to convert digital samples to PAM signals and to deliver the Xmit clock and Frame (byte alignment) signals from the network.

Modulo 24 counter 616 and toggle flip-flop 617 provide a periodic pattern to parallel-in, serial-out shift register 618. Counter 616 increments on each frame (i.e., each time a byte has been clocked out). Shift register 618 is loaded each time the frame signal occurs, to preserve byte alignment, and its data is clocked out by the transmit clock. Multiplexer 611 can be set to deliver the pattern data from shift register 618 to front end 610 during the synchronization phase. Modulo 24 counter 616 continues to count frames during the data transfer phase, thus maintaining synchronism with the pattern sent during the synchronization phase. The registers of comparator array 614 are loaded (by a state machine or microcontroller not shown) with index numbers identifying corrupt frames received and reported by the far-end receiver during the synchronization phase. OR gate 615 indicates when any of the comparators in array 614 have detected a match. When any of the comparators in array 614 detects a match, NAND gate 613 is signaled for that frame (byte) duration. Counter 612 indicates when the LSB of each frame (byte) is to be shifted. NAND gate 613 detects coincidence of signals from OR gate 615 and counter 612 (this is the period when robbed-bit corruption will occur). AND gate 608 then inhibits transmission of data (and generation of CRC) for this one-bit period. This signal could also be provided to the control signal to multiplexer 611 to force transmission of a one as shown during this interval, which is customary, but not required by the present invention. Note that counter 612 and 616 continue to operate, even when multiplexer 611 is sending flags or an all ones idle pattern, to maintain synchronization with the receiver and the network superframe pattern.

FIG. 6 depicts a hardware implementation of the preferred embodiment of the present invention. The present invention may also be implemented using a Digital Signal Processor (DSP) or a suitably powerful microprocessor or a combination of both. Commercially available modems with a DSP can be reprogrammed to perform the above functions.

Figure 8:
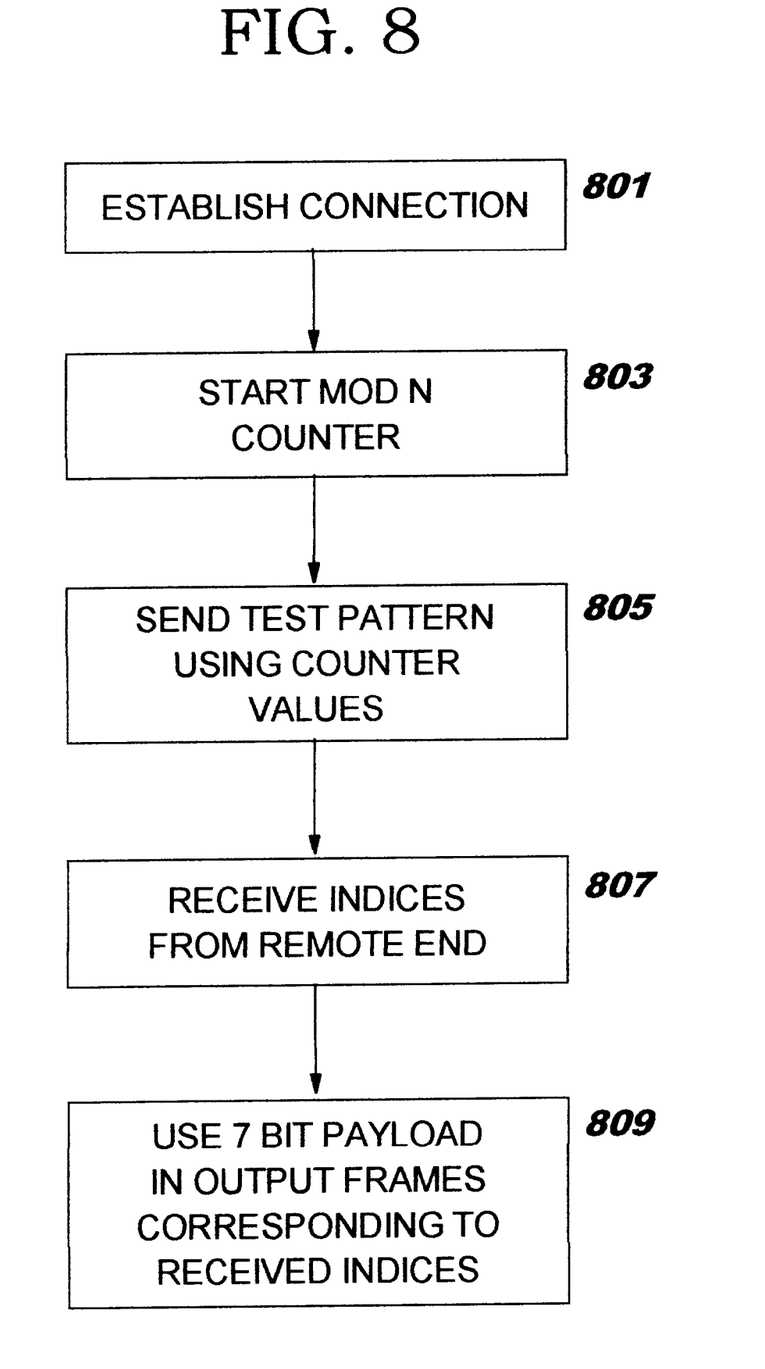
FIG. 8 depicts a method of transmitting in accordance with the present invention.

FIG. 8 depicts the transmitter method in accordance with the present invention. In step 801 a connection is established between a first NID and a second NID through the network. This may be established by placing or accepting a call as is well known in the art. In step 803, a modulo N counter is started. The variable N is related to the expected robbed-bit signaling frequency. In the United States, N may be as small as 6 (robbed-bit signaling affects every sixth sample on a digital trunk) or a multiple of six (e.g., 12 or 24). A modulo 24 counter will be used to demonstrate the present invention. In step 805 the test pattern is placed on the network. In the preferred embodiment, the test pattern is transmitted using values obtained from the modulo 24 counter thus the first five bits of every byte/frame sent contain a value from the counter. Assuming a forty eight byte test pattern, the mod 24 counter completes two cycles (i.e., 0–23) for each test pattern. It is not necessary for the counter to be initialized in order to send the test pattern. The test pattern can begin with any counter value. In accordance with the preferred embodiment there will be two bytes sent for each counter value: XXXXX00 and XXXXXX11 to test each LSB state. The starting index is of no significance. The counter is incremented every frame or for every byte sent. In the preferred embodiment the test pattern is repeatedly sent until the remote end returns the indexes.

In step 807, the synchronization values (e.g., indexes) are received from the remote end. In step 809, the synchronization values (e.g., indexes) are used to indicate frames which will only contain 7 bits of of payload (i.e., user data or transformed user data). With a 7 bit payload eight bits of data are sent but, the LSB is padded. The padded LSB is then available for use by the network for robbed-bit signaling without impacting the user data stream. This can be accomplished by having the output of the mod 24 counter at each count compared to each of the indexes. In this fashion transmitted frames or bytes are matched to the robbed-bit signaling pattern on the digital trunk.

Network Interface Devices—Reception

The receiver function is symmetric to that of the transmitter. During the synchronization phase, it must be capable of receiving the test pattern transparently, without HDLC flags or bit stuffing. The receiver, like the transmitter, may have registers for containing the synchronization values (e.g., indexes) of frames which were affected by robbed-bit signaling. The test for robbing/corruption could occur in hardware or software. If the test is in hardware, the registers could be automatically loaded. If the test is performed by software, the registers could be loaded via a microprocessor interface. During the operational phase, the receiver's deserializer would use a modulo 24 counter and the registered bits to determine when to accept eight bits from the serial line, and when to accept seven and discard the eighth bit.

Figure 7:
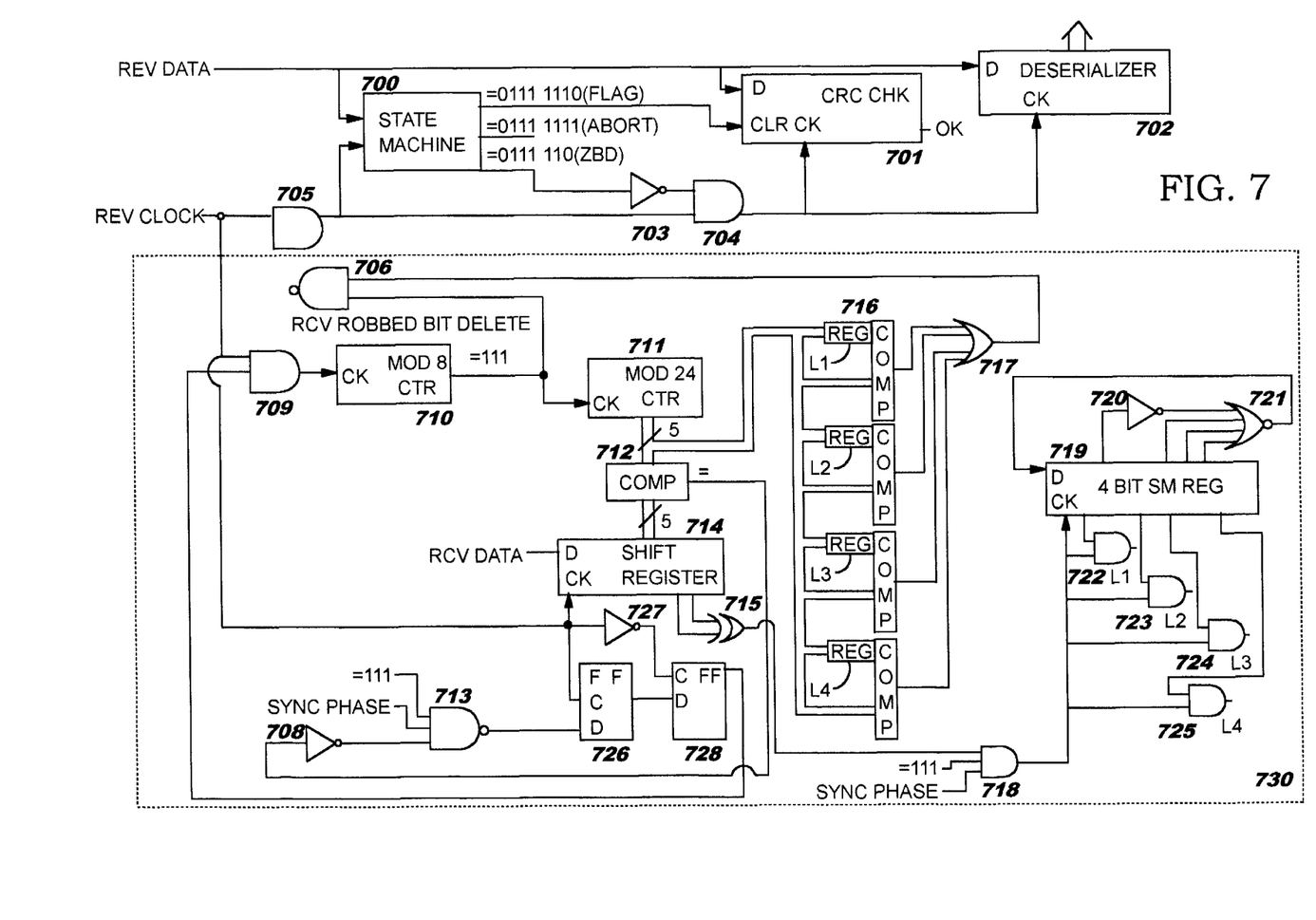
FIG. 7 depicts an embodiment of a receiver in accordance with the present invention.

FIG. 7 depicts the preferred embodiment of the receiver portion of the present invention. The receiver portion operates in the synchronization phase and the operational phase, under the control of a state machine (not shown). Components 700–704 comprise the elements of an HDLC receiver. Element 700 is a state machine or counter which examines the incoming bit pattern for special cases: 0111110—which indicates a transparency bit that is to be deleted; 01111110—which indicates a message boundary flag; and 01111111—which indicates that the frame being received is to be aborted. Inverter 703 and AND gate 704 suppress the clock to the CRC checker 701 and deserializer 702 to remove the transparency bit from the data stream. The receiver can determine where the byte (frame) boundaries are in the received data stream, detect the test pattern or probing pattern in the received data stream, detect which locations of the test pattern if any have been corrupted by robbed-bit signaling, maintain synchronization established by receipt of the test pattern, suppress receipt of bits in the robbed-bit positions, and send robbed-bit/corrupt pattern numbers or indexes to the transmitter.

The receiver depicted in FIG. 7 and described below assumes use of a test pattern similar to that shown in FIG. 5. Inverters 708 and 727, NAND gate 713, and flip-flops 726 and 728, AND gate 709, mod 8 (3-bit) counter 710, mod 24 counter 711, comparator 712, and shift register 714, are active when the connection is first completed. The received data is continually clocked through shift register 714. At eight bit intervals, under the control of counter 710 (which need not be initialized), counter 711 (which also need not be initialized) is incremented and compared to the data presently in shift register 714 by comparator 712, and the result is captured in flip-flop 726. If counter 711 and shift register 714 have equal values, indicating that the pattern in the five MSBs of said shift register 714 are the expected value (previous value plus one, mod 24), flip flop 726 is set, indicating an in phase condition. Flip-flop 728 is set. If counter 711 and shift register 714 have different values, flip-flop 726 is cleared, causing flip-flop 728 to clear, which suppresses one Receive Clock pulse from reaching counter 710. The effect of this clock suppression is to move the byte interval being checked for byte and count alignment one bit time. The combination of components 708, 709, 710, 711, 712, 713, 714, 726, 727, and 728 will continue to sample received data in nine bit groups until the values in counter 711 and shift register 714 match at each sample interval, indicating that synchronization with the received data has been achieved. In the worst case, 1728 bits must be received before synchronization is achieved.

At each comparison point, when decode=111 from counter 710 is active, XOR gate 715 is used to test the two LSBs of the received data word for corruption or bit robbing. If corruption or bit robbing is detected, the pattern number in the five MSBs of shift register is captured into one of the four registers in comparator array 716. Shift register 719, inverter 720, and NOR gate 721 comprise a shift ring in which a one and three zeros continuously circulate. This ring and AND gates 722, 723, 724, and 725 cause each of the four registers to be loaded in sequence. Before synchronization is achieved, incorrect values will be repeatedly loaded into comparator array 716. Once synchronization is achieved, these values are overlaid with correct values indicating the pattern numbers or indexes where corruption occurs due to robbed-bit signaling. The forty-eight byte test pattern with robbed-bits fixed at zero and one will produce exactly four index numbers if robbed-bit signaling is present and no other corruption occurs. These four index numbers will be repeatedly written to the four registers in comparator array 716. Once synchronization is achieved, forty-eight eight-bit words (384 bits) must be received to assure that the correct pattern numbers have been written.

The establishment of synchronization may be determined by receiving a number of bits in excess of that required, or by sampling to see whether flip-flop 726 clears or remains continuously set, or by sampling to assure that the register values in comparator 716 are unchanging, by a state machine or microcontroller (not shown). The state machine negates signal SYNC PHASE, inhibiting further alignment changes to counters 710 and 711 and comparator 716 register updates, and the values captured in comparator 716 registers are sent to the transmitting station.

Once SYNC PHASE has been negated, operational mode is entered. Counter 710, counter 711, comparator array 716, OR gate 717, and NAND gate 706 generate a signal which is active at every robbed-bit position. AND gate 705 inhibits signal RECEIVE CLOCK at robbed-bit times, removing robbed-bits from the received data. State machine 700, CRC checker 701, Deserializer 702, inverter 703, and AND gate 704 function as an HDLC receiver.

FIG. 7 depicts a hardware implementation of the preferred embodiment of the receiver portion of the present invention. The present invention may also be implemented using a Digital Signal Processor (DSP) or a suitably powerful microprocessor or a combination of both. Commercial available modems with a DSP can be reprogrammed to perform the above functions.

Figure 9:
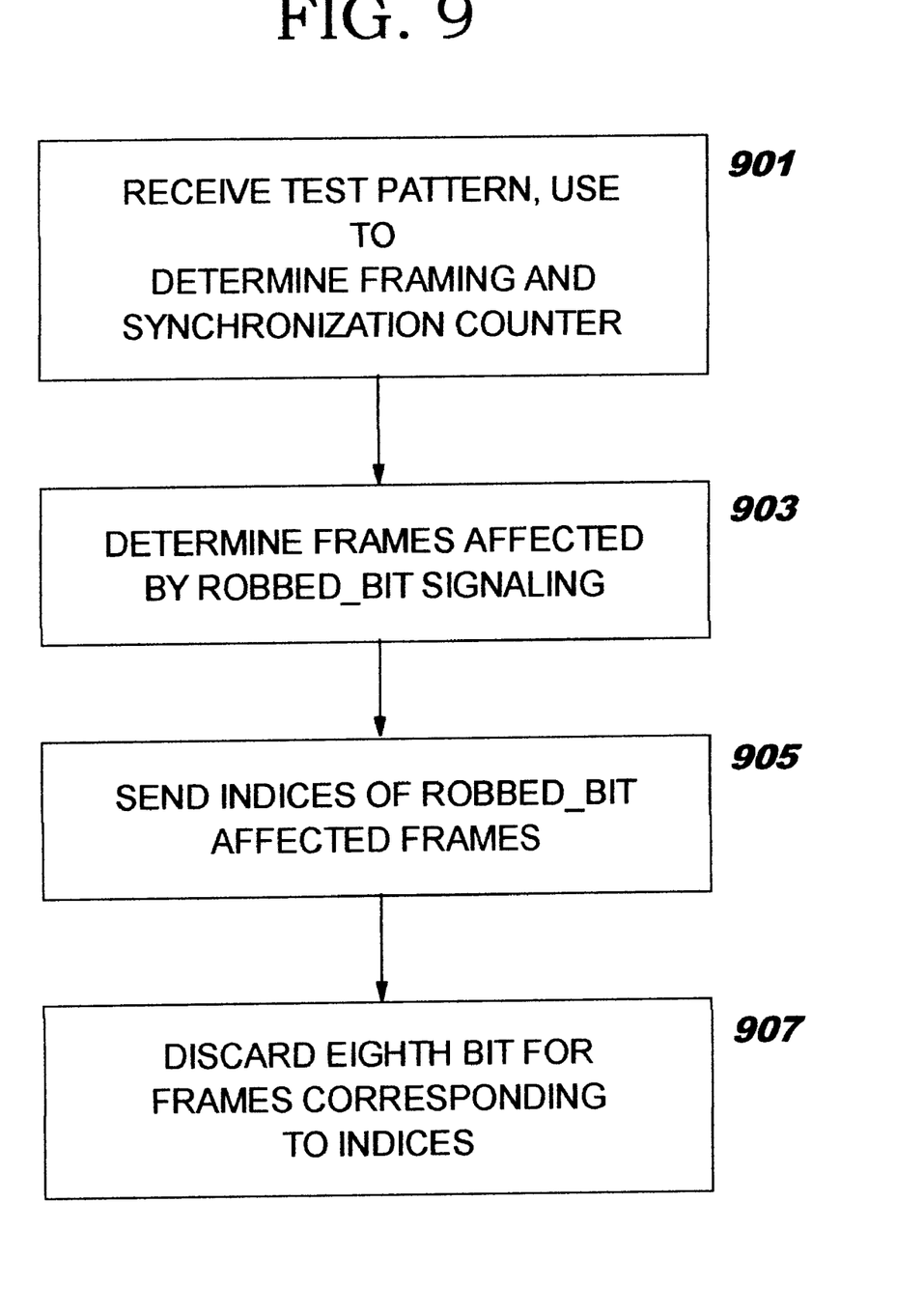
FIG. 9 depicts a method of receiving in accordance with the present invention.

FIG. 9 depicts the receiver method in accordance with the present invention. In step 901 the test pattern is received and processed in a bit wise fashion in order to determine framing (where bytes begin and end with respect to frames/bytes transmitted) and synchronization of the receiver's modulo N counter with the transmitter's modulo N counter. This is performed by looking for Mod 24 incrementing indexes in the received bit stream. Having the appropriate framing and synchronization, the receiver looks for bits that are corrupted or affected by robbed-bit signaling. In step 903 the receiver determines which locations were impacted by robbed bit signaling.

The test pattern or knowledge of the test pattern by the receiver must enable the receiver to unambiguously predict the LSB sent by the transmitter. A robust test pattern also enables the receiver to determine frame boundaries in the presence of corrupted bits. Depending on the particular test pattern used this may entail looking for a '01' or 10' pattern in the LSB positions of each received byte/frame or alternatively, the receiver can compare the two least significant bits of each received frame and look for mismatches. The frame or byte index at these locations is stored. This may entail storing the most significant six or five bits or index. In step 905 the indexes are sent to the transmitter. Before sending the indexes to the transmitter, the receiver may perform error checking on the stored indexes. This may entail checking for 4 indexes that are properly separated (i.e., six bytes away.). The receiver may also check over several test patterns to make assure the robbed-bit signaling and not some spurious condition has been detected.

In step 907, the receiver makes use of the indexes by ignoring or disregarding or deleting the least significant bit of each received frame from the incoming data stream that corresponds with each of the indexes. The receiver's mod 24 counter is incremented by each received frame.

PAM/Analog Considerations

When the present invention is used with a modem that couples to the network via an analog/PAM link there are several considerations that will assure more reliable communication at higher throughput rates. These are detailed below:

1) The test pattern should be composed of high-amplitude values, so that the analog values produced by mu-law conversion have coarse granularity, easing the discrimination task of the receiver. The test pattern should be DC-balanced. The test pattern should conform to the amplitude and frequency requirements of the PSTN. A representative test pattern is shown in FIG. 10. The test pattern shown in FIG. 10 was derived by selecting a series of unique values from the $\mu$-law table. The sequence consists of sets of four positive values followed by four negative values of identical amplitude to provide DC balance and a fundamental frequency of 1 KHz. The amplitudes of values in the test pattern were selected from segments 5, 6, and 7 of the $\mu$-law table to assure adequate amplitude without exceeding network amplitude limits. Such a sequence could be generated at the transmitter and receiver by indexing into a ROM table. The index could be obtained from a Mod N counter or other device.

2) One end must be digitally connected to the PSTN, to permit synchronization with network timing. The other end can derive this timing from the first end. (similar to 56K scheme)

3) The interface electronics at the analog-connected end (106) can include two shift registers and a codec (D/A and A/D converter). Received 8-bit samples from the codec are applied to a parallel-in/serial-out shift register clocked at 64 kbps derived from the 8 KHz sample arrival rate, and sent serially to apparatus like that shown in FIG. 7. Transmitted data such as that from multiplexer 611 is shifted at 64 kbps per second into a serial-in/parallel-out shift register from which 8-bit samples are applied to the codec 8000 times per second.

Figure 11:
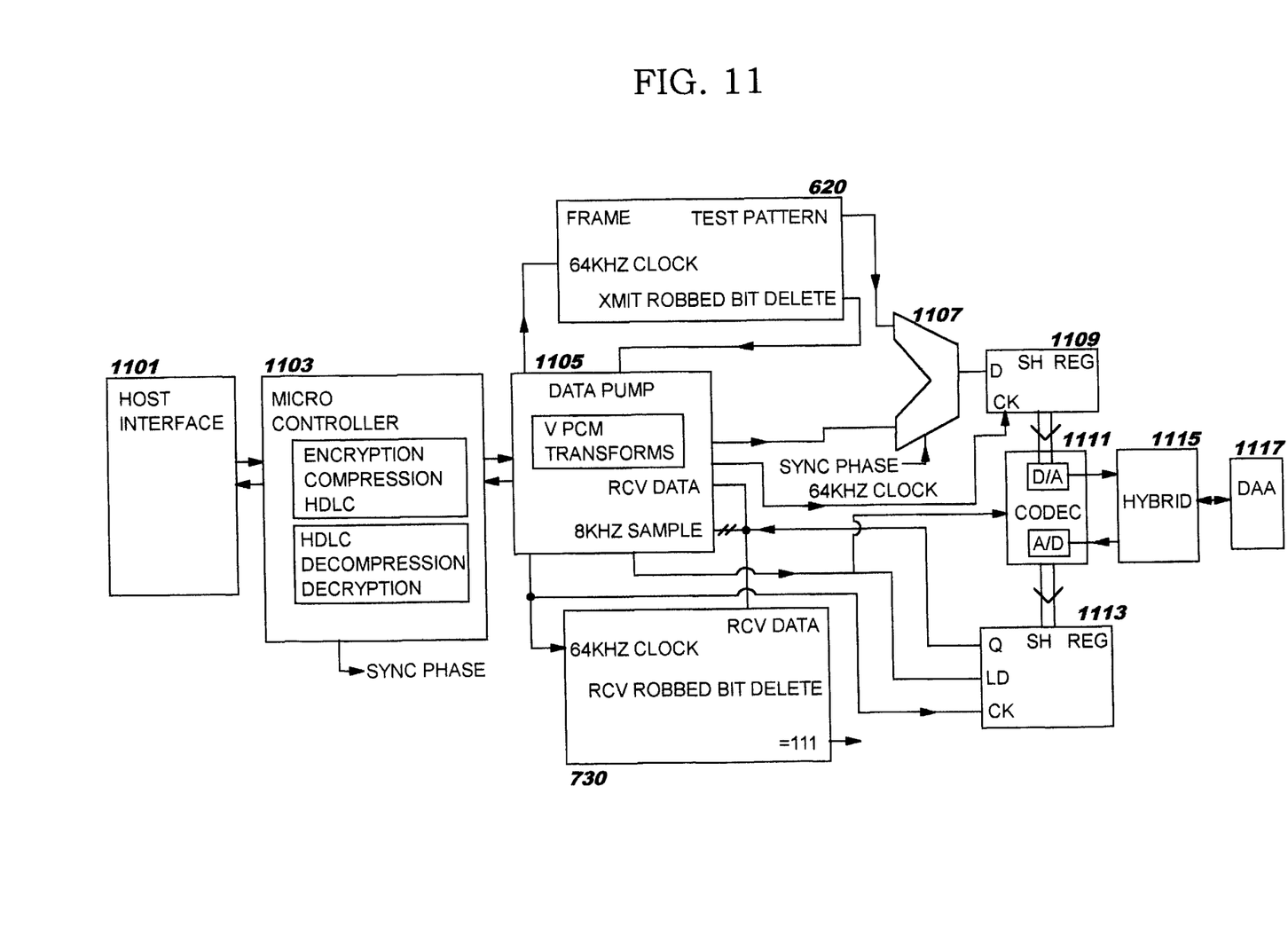
FIG. 11 depicts an embodiment of a PAM modem.

FIG. 11 depicts a V.PCM client modem utilizing the present invention. Host interface 1101 provides user data to and from a host or computer device. In the preferred embodiment the mircocontroller provides one or more encoding functions for transmission of data and decoding functions for reception of data. Hybrid circuit 1115 provides 4-wire to 2-wire conversion, transferring transmitted data to DAA 1117 and separating received data from the combined transmit-and-received data delivered by the DAA. The DAA circuit 1117 presents to the network electrical characteristics conforming to network requirements and provides isolation from the network.

Data pump 1105 includes a phase locked loop which tracks the incoming samples to derive an 8 KHz clock, 8 KHz SAMPLE, based on transitions of received data, and a 64 KHz clock, 64 KHz CLOCK, based on the 8 KHZ clock. Received 8-bit samples from the codec are applied to parallel-in/serial-out shift register 1113 and sent serially to the data pump and receive synchronizer 730. Operating in the same manner as that described for FIG. 7, the receive synchronizer synchronizes to the test pattern sent by the remote end, reports synchronization values where robbed bits are detected, and generates a signal, RCV ROBBED BIT DELETE, to remove bits in robbed bit positions from the received stream once synchronization has been achieved.

Transmit synchronizer 620 generates a test pattern which is sent to multiplexer 1107. During the synchronization interval, transmitted data is shifted at 64 kbps per second into serial-in/parallel-out shift register 1109, from which 8-bit samples are applied to codec 1111, 8000 times per second. Once the remote end has returned the synchronization values corresponding to frames with robbed bits, synchronizer 620 generates signal XMIT ROBBED BIT DELETE to indicate which bit positions should be filled with dummy bits rather than payload data.

ISDN Considerations

In some cases, an ISDN link to another ISDN device or to a PAM NID may have no robbed-bits at all, and be capable of carrying 64,000 bits per second, for instance where both devices are served from the same exchange or where the call is placed with a voice bearer capability instead of data to take advantage of reduced tariffs but is carried on clear trunks. In these cases, the NIDs may use the present invention to detect that the link is capable of 64,000 bits per second. This can be communicated to the transmitter by sending a null synchronization value or a message indicating that the connection can support 64 Kbps communication.

Microcontroller, Processor, Computer or DSP Usable Medium

Many of the functions and operations of the present invention can be embodied in software and carried out on a suitable microcontroller, processor, computer and/or DSP. The software system for controlling the communication system and/or NID may be distributed to subscribers on a computer usable medium such as floppy disk, diskettes, CD-ROM, PCMCIA cards, Flash memory cards and/or any other computer usable medium. Note that the software system may also be downloaded from a network server such as a Internet site accessible via any communications adapter or an NID. The downloaded software can then be loaded into the NID by the host device.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A method of operating a network interface device comprising the steps of:

generating a repeating sequence of values, advancing the sequence with every outbound frame;

sending a test pattern over a network connection, each frame of the test pattern including a synchronization value representing the sequence value or an indication of the position of the sequence value within the sequence and at least one bit for determining which frames are affected by robbed bit signaling;

receiving a message containing zero, one or more synchronization values; and, sending data over the connection in a seven bit payload frame when the repeating sequence corresponds to one of the stored synchronization values, otherwise sending data using an eight bit payload frame.

2. The method of claim 1 further comprising the steps of:

receiving connection type information from the connection;

tailoring the test pattern using the connection type information.

3. A method of operating a network interface device, comprising the steps of:

generating a repeating sequence of values, advancing the sequence with every inbound frame;

receiving a test pattern from a network connection;

synchronizing the repeating sequence using the received test pattern;

detecting which frames of the received test pattern contain robbed-bit signaling, storing the synchronization value of each frame in which robbed-bit signaling is detected, sending the stored synchronization values;

receiving data from the connection and discarding a LSB from the received frame whenever the repeating sequence corresponds to one of the stored synchronization values.

4. A network interface device comprising:

an network interface adapted for providing access to a network, the network interface adapted for establishing a connection;

a sequence generator for generating a repeating sequence, the sequence advancing with every outbound frame;

a transmitter for transmitting a test pattern over the frame aligned connection, each frame of the test pattern including a synchronization value representing the sequence value or an indication of the position of the sequence value within the sequence and at least one bit for determining which frames are affected by robbed bit signaling;

a receiver for receiving a synchronization message, the synchronization message including zero, one or more synchronization values;

wherein user data is transmitted using a seven bit payload frame when the repeating sequence corresponds to one of the received synchronization values; otherwise transmitting user data using an eight bit payload frame.

5. The network interface device of claim 4 further including:

a host interface for receiving a user data stream;

an encoder for encoding the user data stream into an output data stream;

a counter which is synchronized to the occurrence of robbed-bits in an output stream.

6. The network interface device of claim 5 wherein the sequence generator is a modulo N counter.

7. The network interface device of claim 6 wherein the synchronization values are counter values generated by the modulo N counter.

8. The network interface device of claim 6 wherein the synchronization values are obtained using the counter values generated by the modulo N counter to access a table wherein the accessed table entries are used as the synchronization values.

9. A network interface device comprising:

an network interface adapted for providing access to a network, the network interface adapted for establishing a connection;

a sequence generator for generating a repeating sequence, the sequence advancing with every inbound frame;

a receiver for receiving a test pattern, each frame of the test pattern having a synchronization value representing the sequence value or an indication of the position of the sequence value within the sequence and at least one bit for determining which frames are affected by robbed bit signaling;

a synchronizer for synchronizing the sequence generator using the received test pattern;

detecting which frames of the test pattern were affected by robbed bit signaling, storing the synchronization values of each frame in which robbed-bit signaling is detected, a transmitter for transmitting the synchronization values; and wherein user data is received by discarding a LSB from the received frame whenever the repeating sequence corresponds to one of the stored synchronization values.

10. The network interface device of claim 9 further including:
 a host interface for receiving a user data stream;
 an encoder for encoding the user data stream into an output data stream;
 a counter which is synchronized to the occurrence of robbed-bits in an output stream.

11. A method of operating a network interface device comprising the steps of:
 establishing a connection to first destination through a network;
 requesting the highest possible bit rate communication;
 sending a test pattern, the test pattern designed to determine if robbed-bit signaling is utilized on the connection;
 receiving a notification indicating if robbed-bit signaling was detected by the first destination and in which positions of the test pattern;
 starting a counter that synchronizes the sending of data with the robbed-bit signaling, if robbed-bit signaling is detected; and,
 transmitting data stream using eight bits of a byte format, unless the counter indicates that a robbed-bit position is present in which case information is transmitted using the 7 most significant bits of an eight bit byte format with the least significant bit position unused reserved for robbed-bit sampling.

12. A method of operating a network interface device comprising the steps of:
 accepting a connection to first destination through a network;
 exchanging capability information requesting the highest possible bit rate communication including an indication that the first destination is digitally connected;
 receiving a test pattern, the test pattern designed to determine if robbed-bit signaling is utilized on the connection;
 determining from the test pattern wether robbed-bit signaling is present and at which positions of the test pattern;
 sending a notification indicating if robbed-bit signaling was detected and in which positions of the test pattern using a clock derived from the received test pattern;
 starting a counter that synchronizes the reception of data with the robbed-bit signaling on the connection, if robbed-bit signaling is detected; and,
 receiving information in all eight bits of a byte format, unless the counter indicates that a robbed-bit position is present in which case information is received from the 7 most significant bits of an eight bit byte format with the least significant bit position ignored.

13. An article of manufacture comprising a processor useable medium having a processor readable program embodied in said medium, wherein the processor readable program when executed on a processor causes the processor to:
 generate a repeating sequence of values, advancing the sequence with every outbound frame;
 send a test pattern over a network connection, each frame of the test pattern including a synchronization value representing the sequence value or an indication of the position of the sequence value within the sequence and at least one bit for determining which frames are affected by robbed bit signaling;
 receive a message containing zero, one or more synchronization values; and,
 send data over the connection in a seven bit payload frame when the repeating sequence corresponds to one of the stored synchronization values, otherwise sending data using an eight bit payload frame.

14. The article of manufacture of claim 13, wherein the processor readable program when executed on a processor causes the processor to:
 receive connection type information from the connection;
 tailor the test pattern using the connection type information.

15. An article of manufacture comprising a processor useable medium having a processor readable program embodied in said medium, wherein the processor readable program when executed on a processor causes the processor to:
 generate a repeating sequence of values, advancing the sequence with every inbound frame;
 receive a test pattern from a network connection;
 synchronize the repeating sequence using the received test pattern;
 detect which frames of the received test pattern contain robbed-bit signaling, storing the synchronization value of each frame in which robbed-bit signaling is detected,
 send the stored synchronization values;
 receive data from the connection and discarding a LSB from the received frame whenever the repeating sequence corresponds to one of the stored synchronization values.

\* \* \* \* \*